United States Patent [19]
Jung et al.

[11] Patent Number: 5,252,113
[45] Date of Patent: Oct. 12, 1993

[54] MOIL CRACK-OFF SYSTEM FOR A FUNNEL

[75] Inventors: Woocheol Jung; Baekseok Seong; Heungsik Pan; Youngseob Lee; Jaewon Lim, all of Hwasung, Rep. of Korea

[73] Assignee: Samsung Corning Co., Ltd., Kyunggi, Rep. of Korea

[21] Appl. No.: 812,759

[22] Filed: Dec. 23, 1991

[30] Foreign Application Priority Data

Dec. 24, 1990 [KR] Rep. of Korea ............ 90-21591[U]

[51] Int. Cl.$^5$ ............ C03B 33/09; C03B 33/00; C03B 29/00
[52] U.S. Cl. ............ 65/160; 65/165; 65/174; 65/181; 65/284; 225/93.5
[58] Field of Search ............ 65/174, 284, 181, 375, 65/160; 225/93.5

[56] References Cited

U.S. PATENT DOCUMENTS

| | | | |
|---|---|---|---|
| 2,629,206 | 2/1953 | Giffen et al. | 65/177 |
| 2,662,289 | 12/1953 | Giffen | 65/177 |
| 2,840,952 | 7/1958 | Soubier | 65/177 |
| 3,418,099 | 12/1968 | Carter et al. | 65/284 |
| 3,510,287 | 5/1970 | Panczner | 65/284 |
| 3,650,724 | 3/1972 | Lush | 65/174 |

*Primary Examiner*—W. Gary Jones
*Assistant Examiner*—Steven P. Griffin

[57] ABSTRACT

A moil crack-off system for a funnel is provided, wherein a pick-up apparatus is arranged intersectionally above a conveyor that is extended from the shaping process of the funnel, and a pair of ware transfers are arranged in parallel on either side of the conveyor. The funnel that is riding on the conveyor is absorbed at a predetermined position by vacuum pads that are loaded on the carriers of the pick-up apparatus, and is moved in a three-dimensional manner to either of the ware transfers. The ware transfers deliver the three-dimensionally moved funnel to a scoring part and a two-step fire polishing part, which are arranged within the ware transfers, so that the moil of the funnel is cracked off automatically.

13 Claims, 10 Drawing Sheets

MOIL CRACK-OFF SYSTEM FOR A FUNNEL

FIELD OF THE INVENTION

This invention relates to a processing apparatus used for a cathode-ray tube, more particularly it relates to a system for cracking off at a predetermined length, an extended moil area of a funnel wherein a neck is connected to the funnel, just after the funnel is shaped.

BACKGROUND OF THE INVENTION

A funnel is a glass article made by a gob being pressed and cast in a predetermined shape after a gob supplied from a melting hearth is received into a mold.

When the funnel is drawn from the mold the funnel has a moil which is extended in the shape of a tube.

After this moil is cracked off at a predetermined length the edge of the cracked off part is fire polished by a flame, and it is connected with a separately shaped neck in a single body.

The moil of the funnel can be cracked off with the flame of a burner.

FIG. 10 is a perspective view showing an appearance of a prior art moil cracker wherein the moil 4 of the funnel 2 is cracked off at a predetermined length according to a designated line X—X.

The moil cracker 6 includes a yoke ring 8 being able to load the funnel 2.

If the moil 4 of the funnel 2 is inserted into the yoke ring 8, a crack-off wheel (not shown) that is installed under the yoke ring scores a predetermined part of the moil.

After the scoring is done, the circumference of the moil 4 is contacted with chilled air and a flame through an airpipe and a burner (not shown) respectively; a thermal impact is thus generated at the scored part and the moil 4 is cracked off by the thermal impact.

After the above operation is done, a worker transfers the cracked off moil to a fire polishing process.

The conventional method has disadvantages. It is ineffective because a worker has to place and then remove the funnel personally from the cracking-off process to the fire polishing process. Furthermore, this method is very dangerous because the worker must handle a funnel at high temperature (about 450° C).

On the other hand, increased efficiency is achieved by using a plurality of moil crackers installed on an intermittently rotary turret. However, also in this case, all disadvantages are not overcome in that a worker still must handle a funnel of high temperature which has not yet cooled.

Furthermore, when the system breaks down, all the processes are suspended resulting in a large loss of productivity. In addition, this method still has the disadvantage that the worker has to personally transfer the funnel to the next process.

SUMMARY OF THE INVENTION

An object of the present invention is to improve the efficiency of work by automatizing the crack-off process of the moil of a funnel and the fire polishing process of a cracked-off part in one unified process thereby avoiding the danger of a worker holding a hot funnel personally.

To achieve this object in according with the present invention, a moil crack-off system for a funnel is provided, wherein a pick-up apparatus is arranged intersectionally above a conveyor that is extended from the shaping process of the funnel, a pair of ware transfers are arranged in parallel on either side of the conveyor. The funnel that is riding on the conveyor is absorbed at a predetermined position by vacuum pads that are loaded on the carriers of the pick-up apparatus, and is moved in a three-dimensional manner to either of the ware transfers. The ware transfers deliver the three-dimensionally moved funnel to a scoring part and a two-step fire polishing part, which are arranged within the ware transfers, so that the moil of the funnel is cracked off automatically.

Further objects and advantages of the present invention will be apparent with reference to the accompanying drawings.

DESCRIPTION OF THE PREFERRED EMBODIMENT

Figure 1:
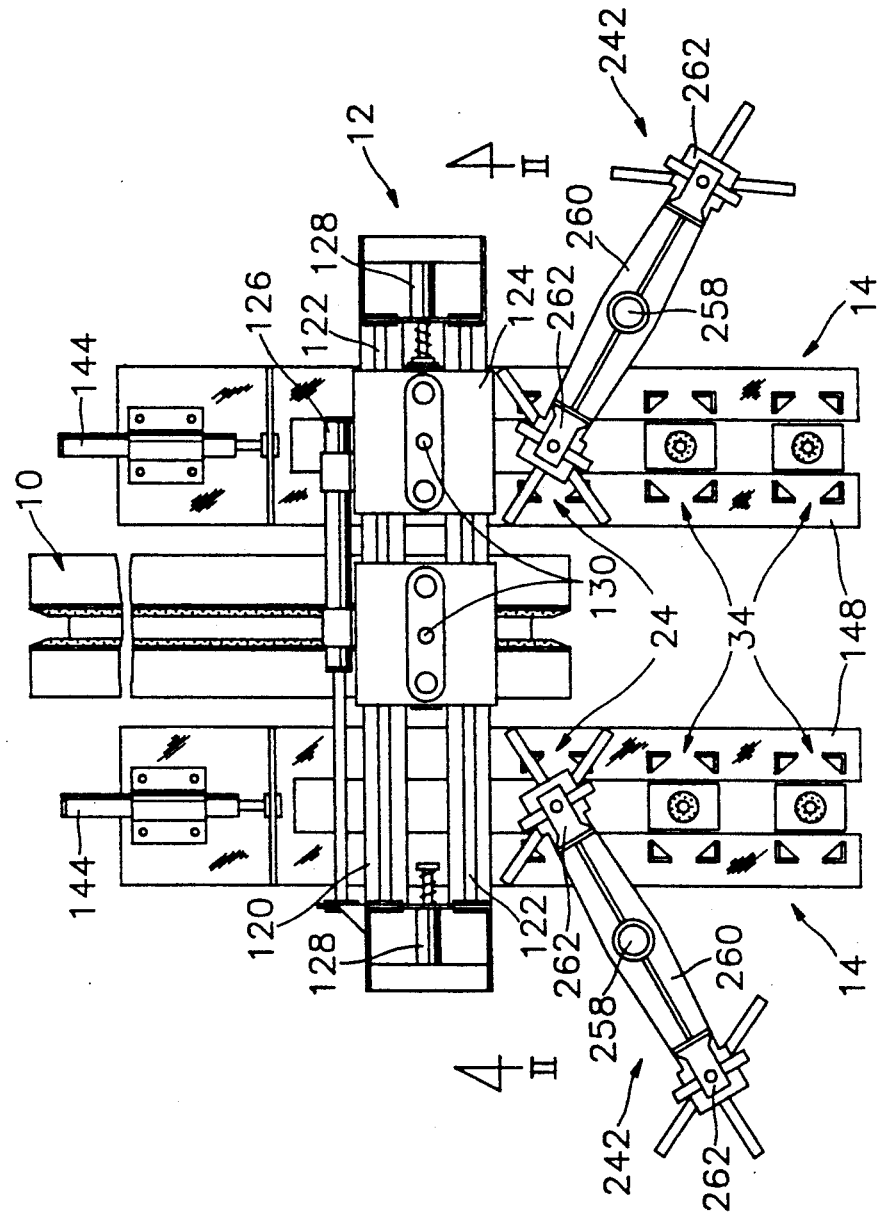
FIG. 1 is a plan view schematically showing a construction of a moil crack-off system in accordance with the present invention.

FIG. 1 illustrates the construction of a moil crack-off system in accordance with the present invention. Reference 10 indicates a conveyor which carries the funnels from the shaping process. Reference 12 indicates a pick-up apparatus that is intersectionally arranged above the conveyor 10. Reference 14 indicates a pair of ware transfers that are arranged in parallel under the pick-up apparatus 12.

The conveyor 10 is placed under a central part of the pick-up apparatus 12 and connects a shaping process of the funnel with the system in accordance with the present invention.

The pair of the similarly constructed ware transfers 14 each comprise scoring parts 24 and two-step fire polishing parts 34. The pick-up apparatus 12 comprises a pair of beams 120 that are substantially parallel. Rails 122 are built on each of the beams 120 and a pair of carriers 124 are placed to be able to travel along the rails 122. The two carriers 124 are arranged at a predetermined interval from each other and are connected to a first reciprocating means 126 so that they can reciprocate respectively between the conveyor 10 and both the ware transfers 14. As the first reciprocating means 126 that can be applied to the present invention, a rodless cylinder or an ordinary double acting cylinder is adequate. Shock absorbers 128 are placed at both ends of the beams 120 so that the shock that occurs at a stop point of the reciprocation is not delivered to the carriers 124.

Figure 2:
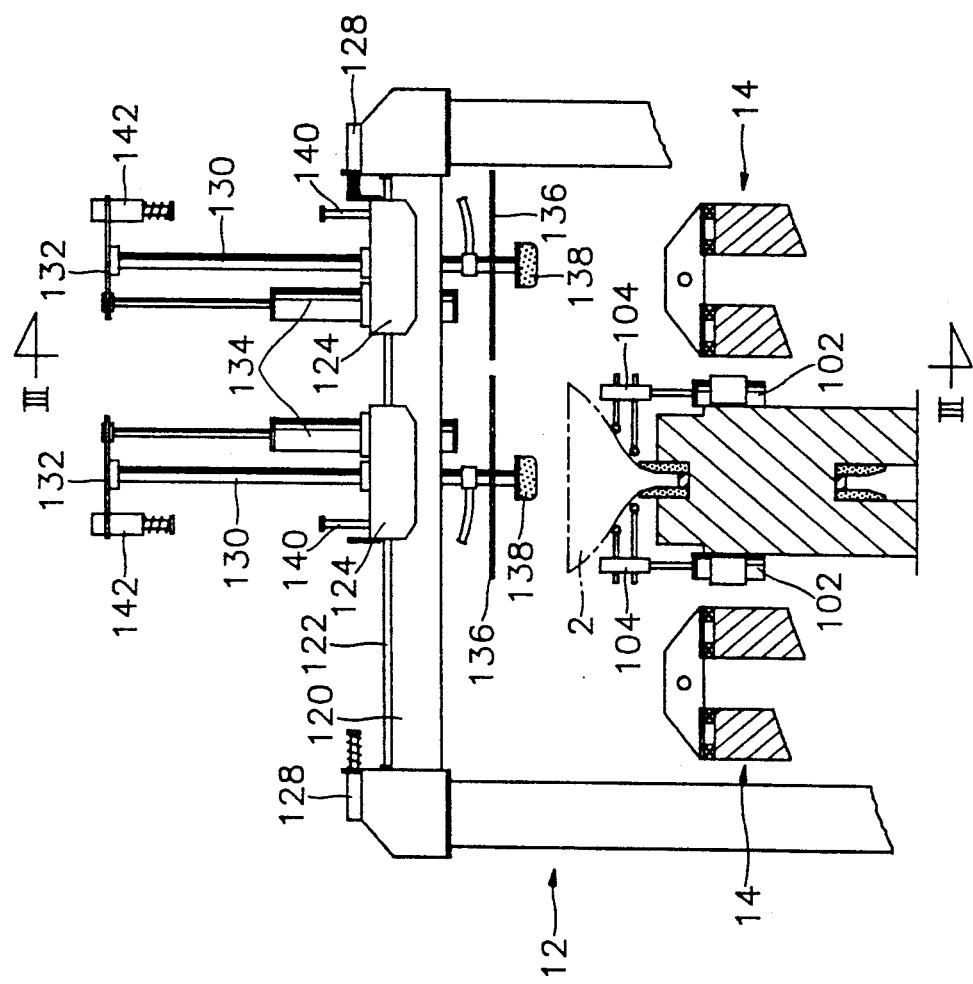
FIG. 2 is a cross-sectional view seen in the direction of the arrow along line II—II of FIG. 1.

FIG. 2 is a sectional side view seen in the direction of the arrow through line II—II as shown in FIG. 1 so as to illustrate in detail the construction of the carriers 124.

Each carrier 124 has a rod 130 that is vertically extended.

On the upper ends of the rods 130, plates 132 are interposed and connected with the exclusive elevating means 134. An ordinary double acting cylinder may be used as the elevating means 134 in accordance with the present invention.

Also, the lower ends of the rods 130 are extended to lower positions than those of the carriers 124, where they hang shields 136 and vacuum pads 138. The plates 132 have shock absorbers 142 that are contacted with screws 140 set up on each carrier 124. The bottom dead points of each rod 130 are controlled by the screws 140.

At the end part of the conveyor 10 and positioned at the central part under the pick-up apparatus 12 there are arranged a pair of lifters 102 that are synchronized with each other.

On the upper ends of the lifters 102, sensors 104 such as a photocoupler are installed to sense the presence of the funnel 2 that is supplied along the conveyor 10.

Figure 3:
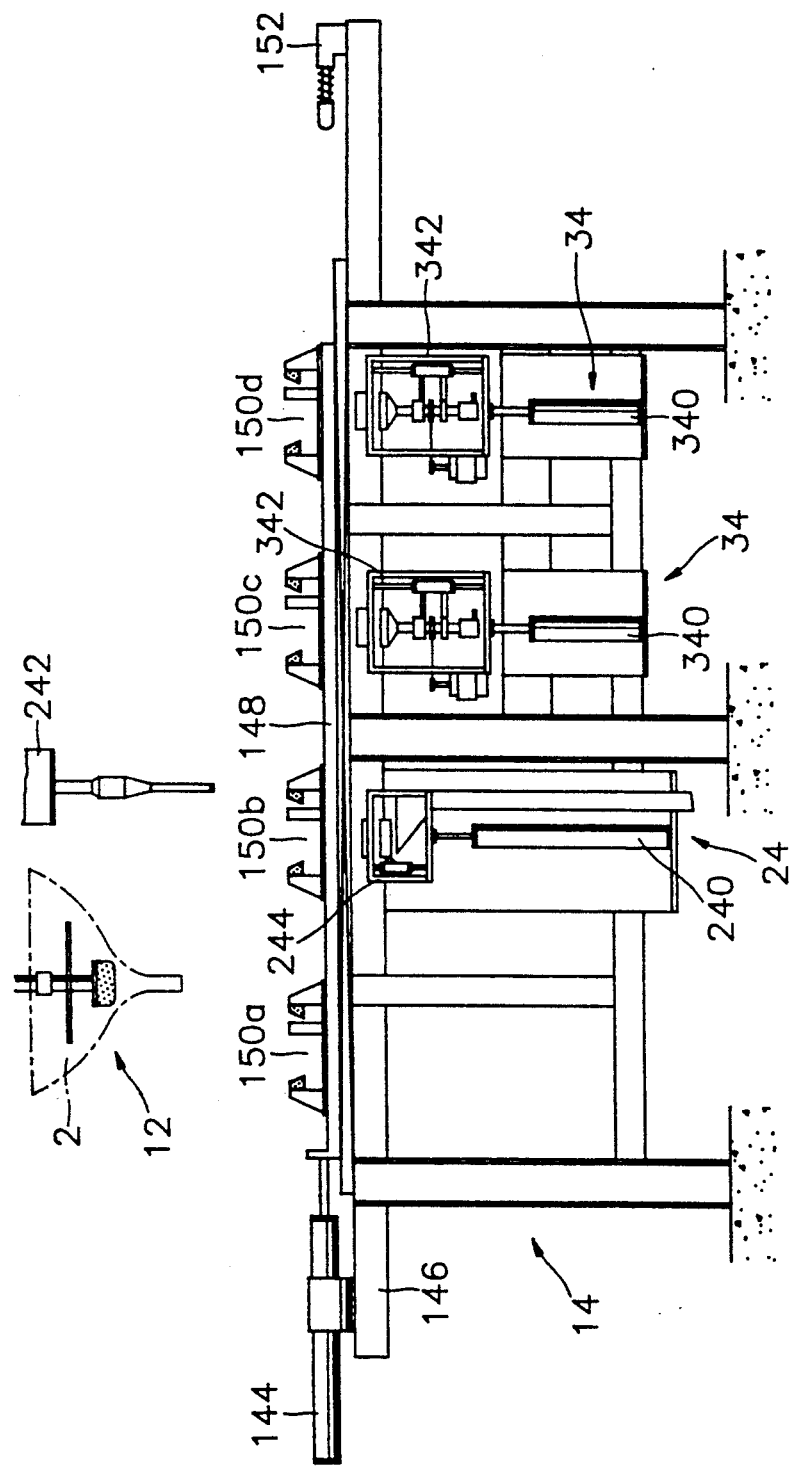
FIG. 3 is a cross-sectional view seen in the direction of the arrow along line III—III of FIG. 2.

FIG. 3 is a sectional side view seen in the direction of the arrow along line III—III as shown in FIG. 2 so as to illustrate the construction of the ware transfers 14.

The ware transfers 14 have beds 146 that support second reciprocating means 144. The second reciprocating means 144 are connected with trailers 148 that slide on the beds 146 so as to make the trailers 148 reciprocate intermittently. An ordinary double acting cylinder can be used as the second reciprocating means 144 in accordance with the present invention.

The trailers 148 assume a forked shape as shown in FIG. 1. Four jigs 150a, 150b, 150c, 150d for allowing the funnel 2 to be properly reached are arranged at even intervals on four places on the upper side of the trailers 148.

The first jig 150a is arranged at a place which receives funnel 2 from the pick-up apparatus 12.

The second jig 150b is arranged at a place that corresponds to the position of the scoring part 24.

The third jig 150c is arranged at a place that corresponds to the position of the fire polishing part 34 of a first step.

The fourth jig 150d is arranged at a place that corresponds to the position of the fire polishing part 34 of a second step.

A stroke of the trailers 148 that are moved by the second reciprocating means 144 is limited to a length that corresponds with each interval between the jigs 150a-d. Also, the stroke is limited by the shock absorbers 152 that are placed on the end of the beds 146.

The scoring parts 24 have scoring lifters 240 that are placed under the beds 146, and scoring apparatus 242 that are set up opposite each other above the beds 146.

The two-step fire polishing parts 34 have fire polishing lifters 340 associated therewith for both steps.

Differential cylinders are used as the scoring lifters 240 and the pair of fire polishing lifters 340 in accordance with the present invention.

Figure 4:
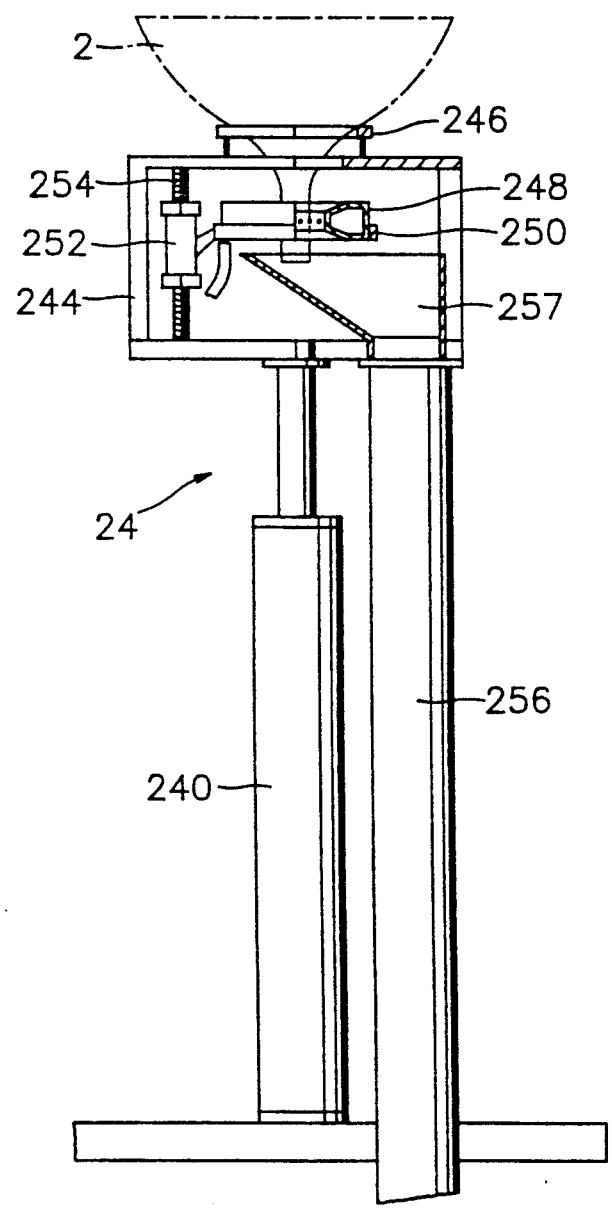
FIG. 4 is a sectional side view showing a lower part construction of the scoring part shown in FIG. 3.

FIG. 4 is a side view that illustrates the construction of the circumference of the scoring lifters 240 of the scoring parts 24, and half of the upper part in the figure is illustrated by a sectional view.

The scoring lifters 240 make the frame located at the upper ends of the scoring lifters ascend or descend. Yoke rings 246 for receiving the funnel 2 inserted therein are placed on the tops of scoring frames 244. A burner 248 and a burner stand 250 are arranged under the yoke rings 246.

This burner 248 is suspended by a nut 252. The nut 252 can ascend along an adjustable screw 254 that is supported by the scoring frames 244, and can control the height of the burner 248 in the circumference of the funnel 2 that is inserted through the yoke ring 246.

A hopper 257 that is connected with a chute 256, is placed just beneath the burner stand 250. The hopper 258 receives the cracked off moil 4 and sends it into the chute 256, where it is taken away to a predetermined place.

Figure 5:
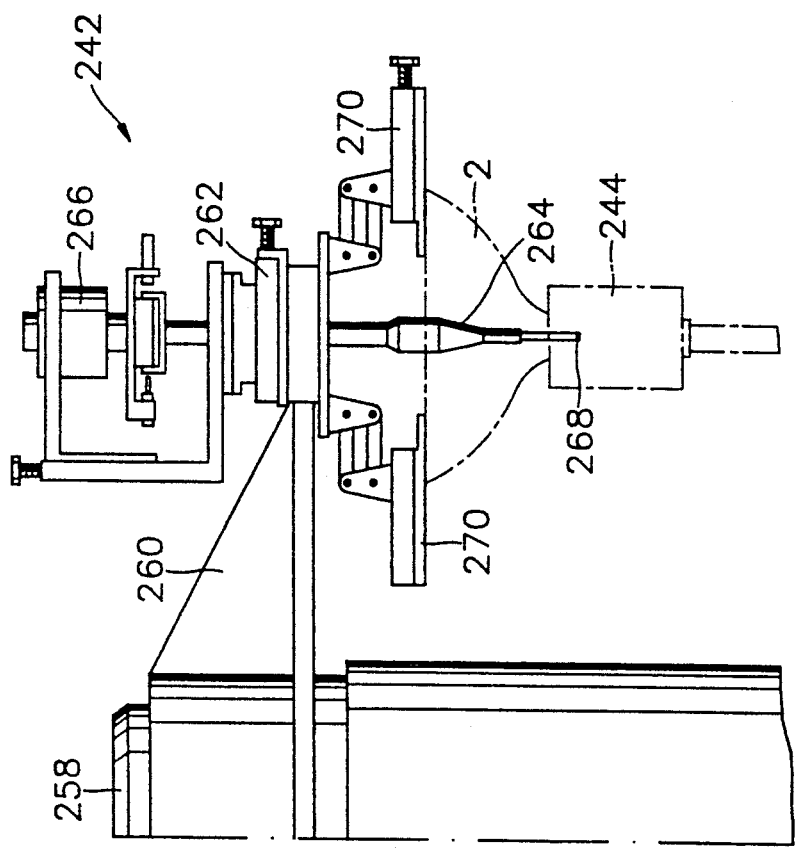
FIG. 5 is a side view showing an upper part construction of the scoring part shown in FIG. 3.

FIG. 5 is a side view that illustrates the construction of the scoring apparatus 242 that is placed above in the scoring part 24.

The scoring apparatus 242 is composed of arms 260 that are supported on a fixing pivot 258. A pair of identical scoring heads 262 are supported at either end of the arms.

At all times, one of the pair of scoring heads 262 is positioned above the scoring part 24 of the trailer 148, so it can score the funnel 2 supplied. The other scoring head of the pair stands by as a replacement.

The scoring head 262 has a rotary arbor 264 that is placed vertically, and a rotary actuator 266 that works the rotary arbor 264. A scoring tip 268 for scoring a crack on an internal circumference of the funnel 2 is attached to an end of the rotary arbor 264. Also, a plurality of guiders are placed in the circumference of the rotary arbor 264.

The construction of the scoring head 262 as described above is similar to that used in the past in this field.

Figure 6:
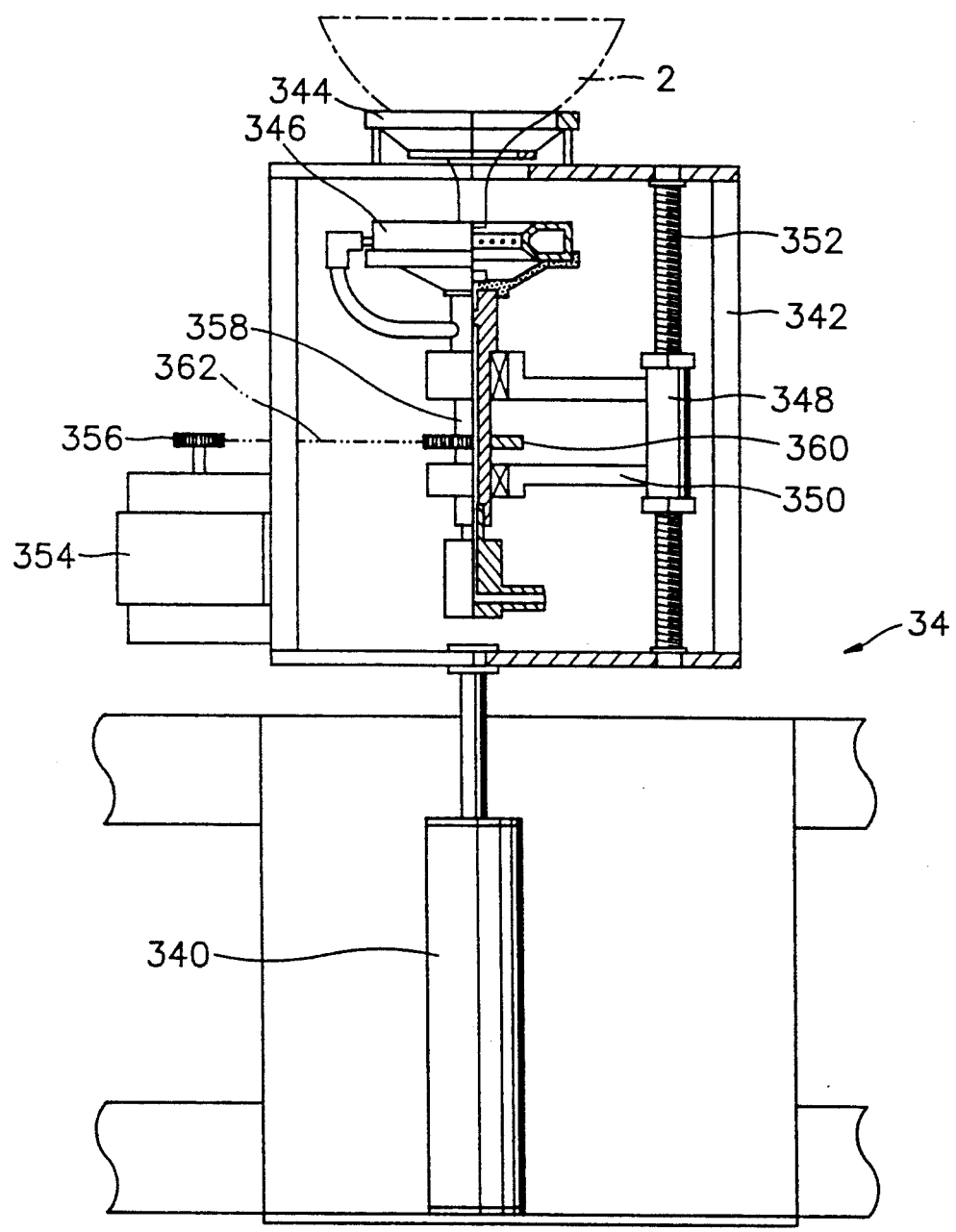
FIG. 6 is a sectional side view showing a construction of a fire polishing part shown in FIG. 3.

FIG. 6 is a side view that illustrates the construction of the fire polishing part 34 shown in FIG. 3, and half of the upper part in the figure is illustrated by the sectional view.

The fire polishing lifter 340 allows a fire polishing frame 342 to ascend or descend. Likewise, the fire polishing frame 342 has the yoke ring 344 on the top of it. The burner 346 is placed under the yoke ring 344, and is also suspended by the arms 350 of the nut 348. The nut 348 can ascend or descend along an adjustable screw 352 that is supported by the fire polishing frame 342, so as to control the height of the burner 346 at the circumference of the moil 4 of the funnel 2 that is inserted through the yoke ring 344. On the other hand, the burner 346 is supported to be able to be rotated by the arm 350 of the nut 348.

A motor 354 that is fixed at one side of the fire polishing frame 342 has a drive sprocket 356, and chains are connected between the drive sprocket 356 and a driven sprocket 360 that is fixed at a pipe of the burner 346. Accordingly, the burner 346 can be rotated by the motor 354, being supported by the arm 350.

Figure 7:
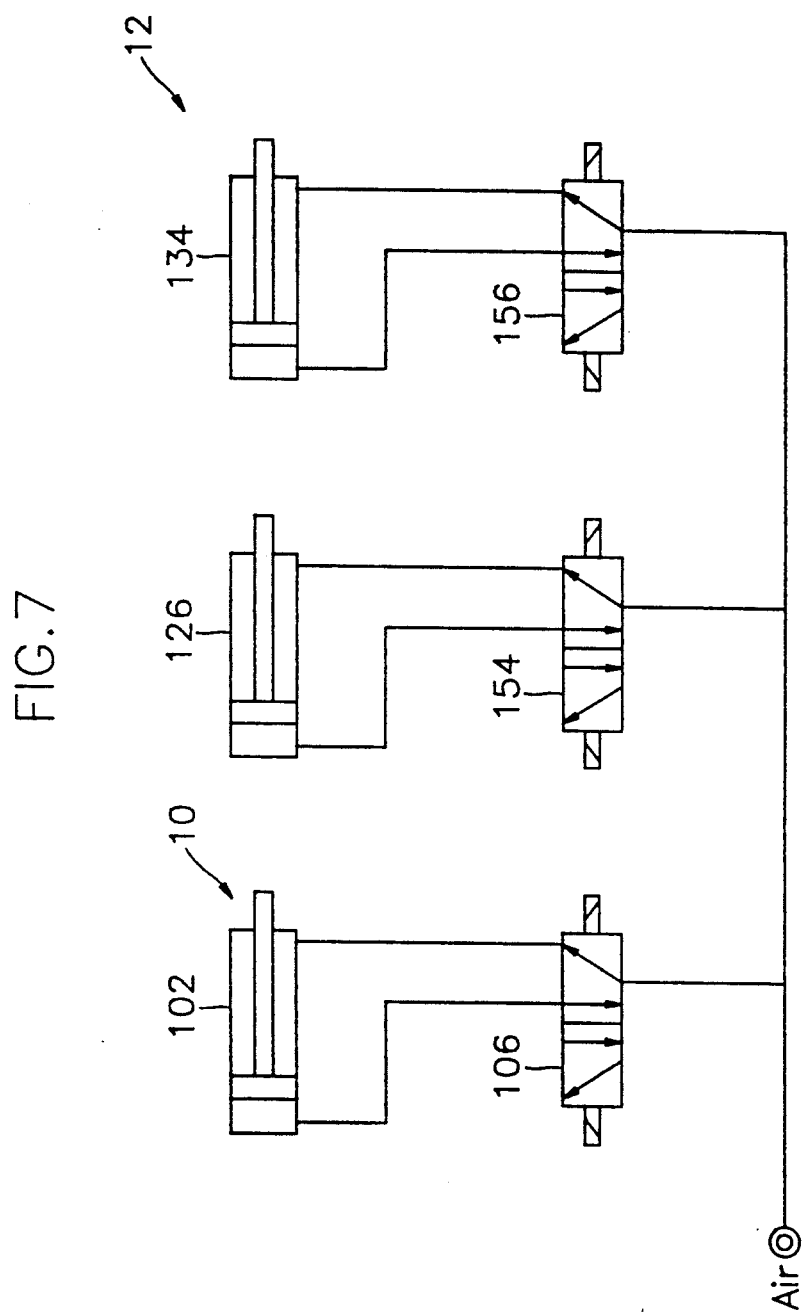
FIG. 7 is a pneumatic circuit diagram related to a pick-up apparatus shown in FIG. 1.
Figure 9:
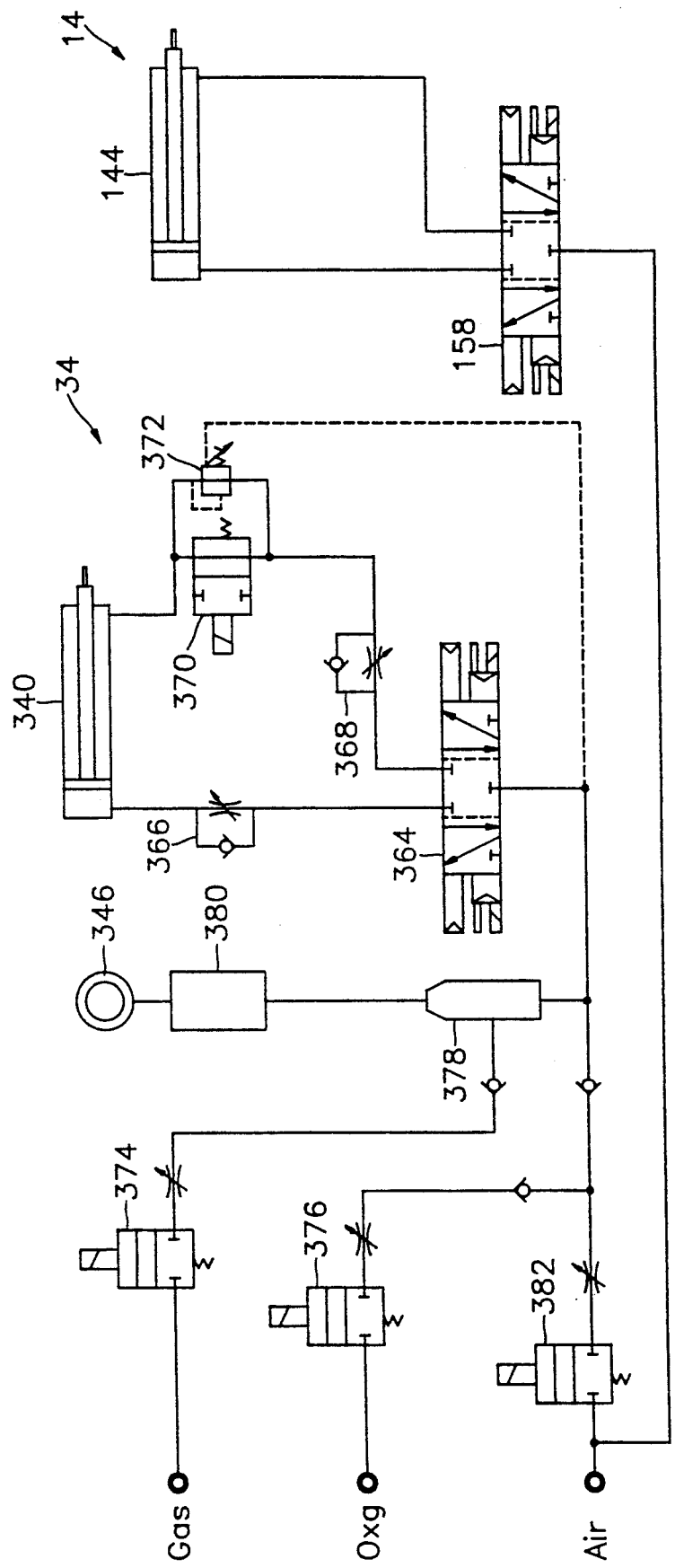
FIG. 9 is a pneumatic circuit diagram related to the fire polishing part shown in FIG. 3.
Figure 10:
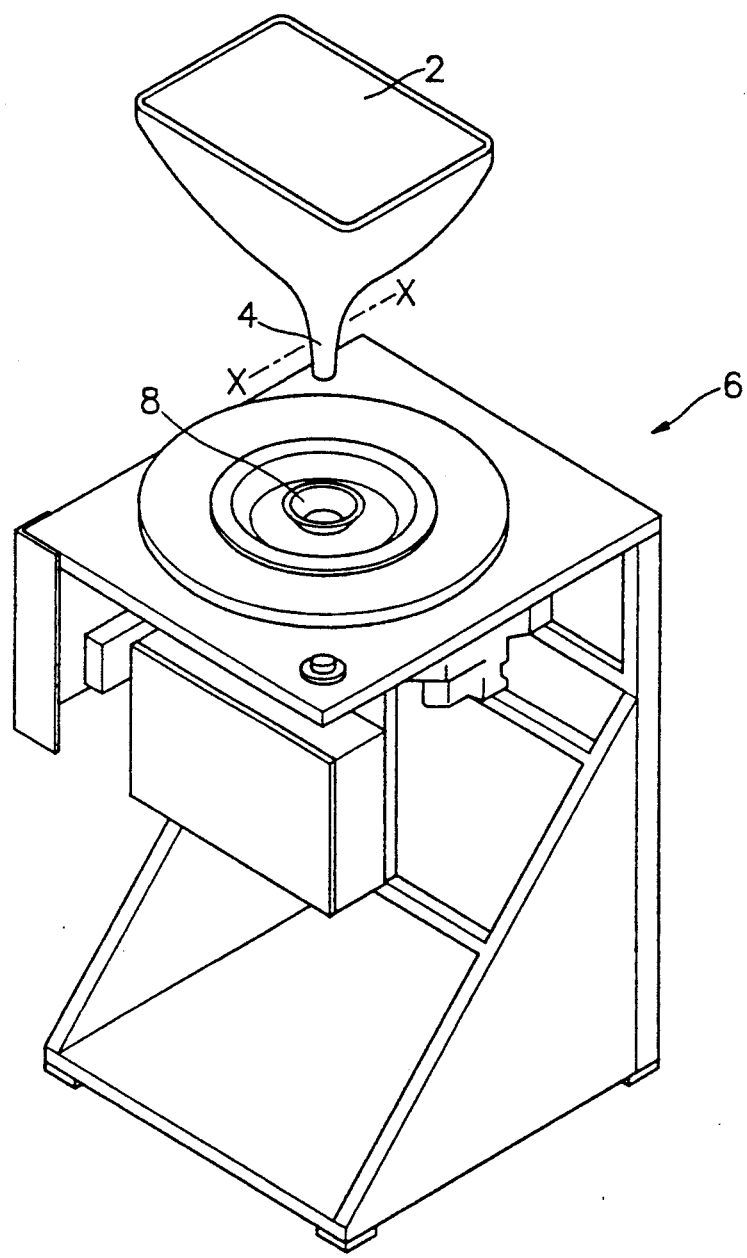
FIG. 10 is perspective view of a prior art moil cracker.

FIG. 7 and FIG. 9 illustrate the pneumatic circuit for controlling the system of the present invention.

Referring to FIG. 7, the lifter 102 of the conveyor 10, and the first reciprocating means 126 and the elevating means 134 of the pick-up apparatus 12, are supplied with compressed air respectively via 5-port 2-way valves 106, 154, 156.

The lifter 102 ascends when the 5-port 2-way valve is in the right hand position, and descends when the 5-port 2-way valve is in the left hand position.

The first reciprocating means 126 advances when the 5-port 2-way valve is in the right hand position, and recedes when the 5-port 2-way valve is in the left hand position.

The elevating means 134 descends when the 5-port 2-way valve is in the right hand position, and ascends when the 5-port 2-way valve is in the left hand position.

The system of the present invention is started by a signal generated by sensors 104 that are placed on the conveyor 10. The 5-port 2-way valves 106, 156 move toward the right hand position in response to a signal generated by the sensors 104 when the existence of the funnel 2 is sensed.

As a result, the lifter 102 ascends, so as to lift the funnel 2 to a predetermined height. Also, the elevating means 134 of both carriers 124 descend to the bottom dead point, and so that the vacuum pads 138 of one carrier 124 is contacted on the internal circumference of the funnel 2.

In the bottom dead point, the negative-pressure is applied only to the vacuum pad 138 that is positioned above the conveyor 10. The negative-pressure can be easily generated by an ordinary vacuum pump, and this negative-pressure provides the force whereby the funnel is picked up. Moreover, selectively supplying the negative-pressure can be achieved by embodying a well-known rotary valve or a directional control valve of a spool valve type.

The vacuum pad 138 of the left rod 130 absorbs by suction the funnel 2 which is lifted by the lifter 102 (refer to FIG. 2).

While a negative-pressure is applied to the vacuum pad 138, the 5-port 2-way valve 156 moves to the left hand position, and so the elevating means 134 ascends; subsequently, the 5-port 2-way valve 154 moves to the right hand position, and so the first reciprocating means 126 advances.

While the first reciprocating means is in the advance position, the 5-port 2-way valve 156 again moves to the right hand position, so that all the elevating means 134 descend.

As a result, the funnel 2 that is absorbed by the left vacuum pad 138 is moved three-dimensionally to the ware transfer 14 positioned in the left of the conveyor 10, and simultaneously, the vacuum pad 138 in the right is contacted on the internal face of a newly supplied funnel.

At this point in time, the supply of the negative-pressure is transferred from the left vacuum pad 138 to the right vacuum pad 138. Accordingly, the funnel that is absorbed by the vacuum pad 138 is released and received duly on the first jig 150a of the trailer 148 shown in FIG. 3. Also, the right vacuum pad 138 absorbs the funnel 2 on the conveyor 10.

Again, the 5-port 2-way valve 156 moves to the right hand position, and so the elevating means 134 ascends. Subsequently, the 5-port 2-way valve 154 moves to the left hand position and so, the first reciprocating means 126 recedes. At this time, the left vacuum pad 138 is emptied, and the right vacuum pad 138 picks up the new funnel.

When the recession of the first reciprocating means 126 finishes, the 5-port 2-way valves 106, 156 begin the initial state of moving to the right hand position, and so the above moving process is repeated.

Like the above, the new funnel 2 that is supplied by the conveyor 10, is in turn carried to and loaded on one of the ware transfers 14 by the pick-up apparatus 12.

Figure 8:
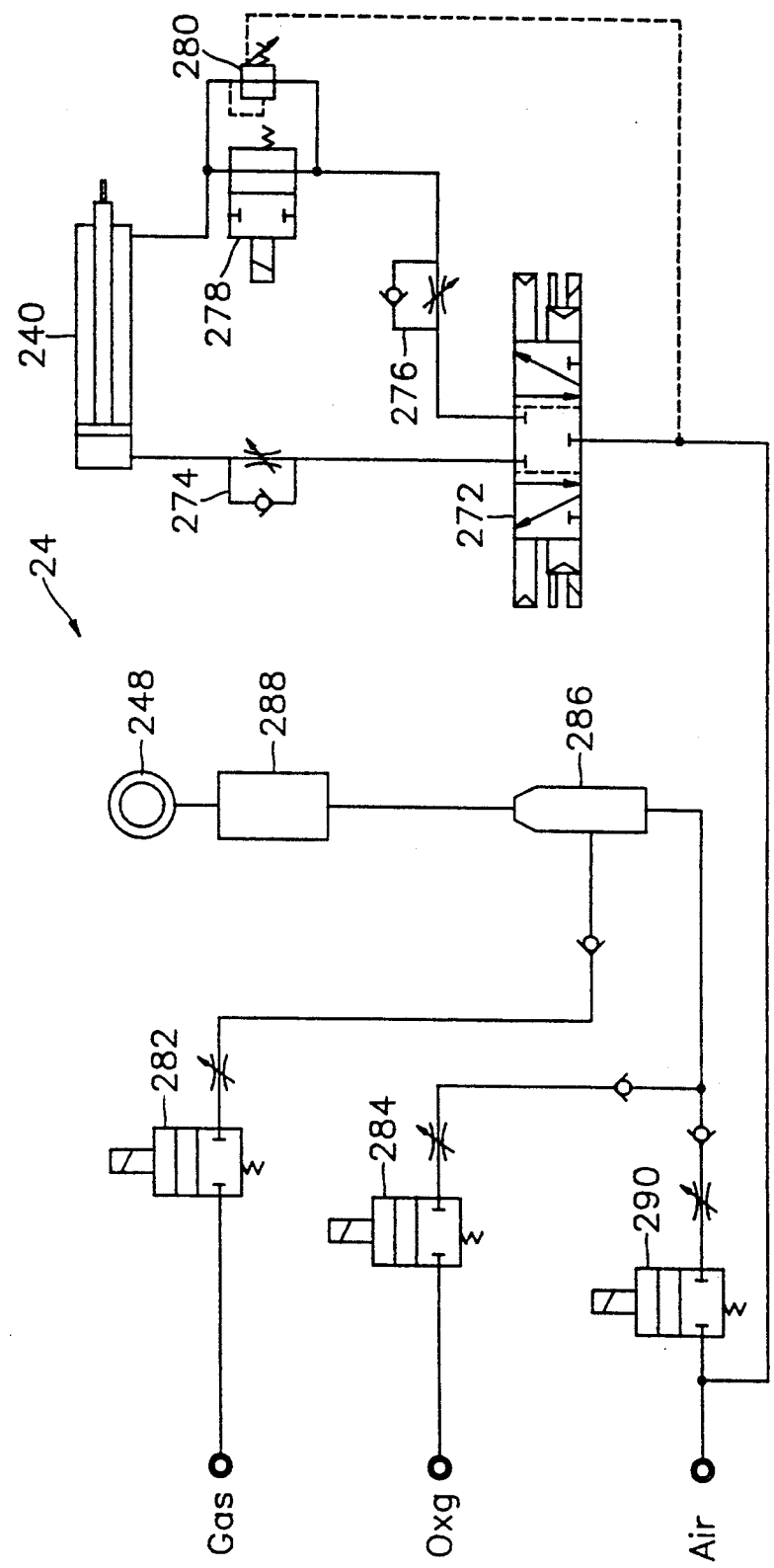
FIG. 8 is a pneumatic circuit diagram related to the scoring part shown in FIG. 3.

Referring to FIG. 8 or FIG. 9, in the ware transfer 14, the second reciprocating means 144, the scoring lifter 240 and the pair of fire polishing lifters 340 respectively are controlled by the 5-port 3-way valves 158, 272, 364.

The second reciprocating means 144 advances when the 5-port 3-way valve 158 is in the right hand position, recedes when in the left hand position, and pauses when in a neutral position.

Likewise, the scoring part 240 and both fire polishing lifters 340 respectively ascend when the 5-port 3-way valve 272, 364 is in the right hand position, descend when in the left hand position, and pause when in the neutral position.

In the scoring part 24, flow control valves 274, 276 respectively are set up at a flow line that is open to both sides, and so the flow control valves 274, 276 control the movement speed of the scoring lifter 240 to a predetermined level.

Also, a cushion valve 278 that is set up only at the flow line of the one side, is the valve which causes the scoring lifter 240 to be operated more slowly than the predetermined speed at a predetermined position. The relief valve 280 is a valve for controlling uniformly the air pressure through the cushion valve 278.

Oxygen and a fuel gas respectively are supplied to the burner 248 of the scoring part 24 through the cushion valves 282, 284. The oxygen and fuel gas are combusted in the burner 248 after they pass through a mixer 286 and a backfire checker 288. Also, the compressed air can be supplied to the burner 248 through the cushion valve 290.

In the fire polishing part 34, the flow control valves 366, 368 are set up respectively on the flow lines that are open to both sides of the fire polishing lifter 340; accordingly, the flow control valves 366, 368 control the movement speed of the fire polishing lifter 340.

The cushion valve 370 which is set up only on the flow line of the one side, is the valve which causes the fire polishing lifter 340 to be operated more slowly than a predetermined speed at a predetermined position. The relief valve 372 is the valve for controlling the air pressure of the cushion valve 370.

Oxygen and fuel gas are also supplied to the burner 346 of the fire polishing part 34 through the cushion valves 374, 376, and the oxygen and the fuel gas are put into combustion in the burner 346 after they pass through the mixer 378 and the backfire checker 380. Also, compressed air can be supplied to the burner 346 through the cushion valve 382.

At the point in time that the funnel 2 is received duly on the first jig 150a of the trailer 148, and when both the elevating means 134 ascend to a top dead point, the second reciprocating means 144 advances, as the 5-port 3-way valve 158 moves to the right hand position.

If the second reciprocating means 144 advances, then the first jig 150a is moved to the scoring part 24, the second jig 150b is moved to a position above that of the fire polishing part 34, the third jig 150c is moved to a position above that of the two-step fire polishing part 34, and the fourth jig 150d is moved to the removal position of the funnel 2 at the same time.

When the advance of the second reciprocating means 144 is completed, the 5-port 3-way valve 158 moves to a neutral position, and the second reciprocating means 144 pauses at a state of being advanced.

While the second reciprocating 144 means pauses, the 5-port 3-way valves 272, 364 that are subordinate to each lifter 240, 340, move to the right hand position.

Accordingly, the scoring lifter 240 and both the fire polishing lifters 340 ascend.

By the ascending of the scoring lifter 240, the funnel 2 is transferred from the first jig 150a to the yoke ring 246 of the scoring frame 244, and then moves toward the scoring apparatus 242. By the ascending of the fire polishing lifters 340 in the fire polishing part 34 of the first step, the funnel 2 is received duly on the second jig 150b for transfer to the yoke ring 344 of the fire polishing frame 342; and in the fire polishing part 34 of the second step, the funnel 2 is received duly on the third jig 150c, for transfer to the yoke ring 344 of the fire polishing frame 342.

Similarly, when all the lifters 240, 340 of the ware transfer 14 ascend, again the 5-port 3-way valve 158 moves to the left hand position, and so the second reciprocating means 144 recedes to a first position.

The second reciprocating means 144 waits in the receded position until the lifters 240, 340 return (i.e. descend), while the new funnel 2 is supplied on the first jig 150a through the pick-up apparatus 12.

On the other hand, the above edges of the funnel 2 that is ascended from the scoring part 24 are contacted with the guiders 270 and are held by the guiders 270, and a rotary arbor 264 is inserted into the inside of the moil 4 of the funnel 2, as shown in FIG. 5.

In this state, as the rotary cylinder 266 moves the rotary arbor 264, the scoring tip 268 that is being rotated scores the internal circumference face of the moil 4 of the funnel 2 in an ordinary manner.

Next, just after cool air is supplied to the scored part of the funnel 2 for about one second through the additional line (not shown), each cushion valve 370 opens, and the burner 248 heats the circumference of the moil 4 of the funnel 2.

Heating by the scoring part 24 is performed by the burner 248 for about two seconds, and the moil 4 is cracked off by the thermal impact that is generated at this time.

The cracked-off moil 4 is transferred to the chute 256, riding under the hopper 257 that is supported by the scoring frame 244, and is taken away to a predetermined place, as shown in FIG. 4.

Just after the cushion valves 282, 284 close and the heating finishes, the cushion valve 290 opens. Accordingly, the compressed air that is supplied through the cushion valve 290 slightly cools the heated part of the funnel 2.

The 5-port 3-way valve 272 moves to the left hand position almost simultaneously with the opening of the cushion valves 282, 284, and the scoring lifter 240 descends. Accordingly, the scoring lifter 240 descends when the heating finishes, and so the funnel 2 that was transferred to the yoke ring 246 is received duly at the second jig 150b.

On the other hand, the heating is performed in the fire polishing part 34 together with the scoring part 24. Namely, when the fire polishing lifter 340 ascends, the cushion valves 374, 376 open. As a result, fuel gas and oxygen are supplied to the burner 346, and so the burner 346 heats the funnel 2.

The heating in the fire polishing part 34 is performed so as to transform the edge of the cracked-off part of the funnel 2 into a form that is appropriate for the next process.

In the process of transforming, the fire polishing part 34 and the burner 346 heat the cracked-off part of the funnel 2, the burner 346 being rotated by the motor 354.

Unlike in the scoring part 24, when the heating finishes in the fire polishing part 34, the 5-port 3-way valve 364 moves to the left hand position, and the fire polishing lifter 340 descends so that the fire polishing lifter 340 descends more slowly than the scoring lifter 240.

The fire polishing lifter 340 transfers the funnel 2 to the third jig 150c of the fire polishing part 34 in the first step during descending, and transfers the funnel 2 to the fourth jig 150d of the fire polishing part 34 in the second step.

Accordingly, after the fire polished funnel 2 is automatically transferred to the third jig 150c and the fourth jig 150d from the yoke rings 344 of each fire polishing frame 342, each fire polishing lifter 340 finishes to descend.

Next, the 5-port 3-way valve 158 moves again to the right hand position, and so the trailer 148 advances. As a result of that, after the new funnel 2 that is received duly at the first jig 150a is transfer red to the scoring part 24, that of the second jig 150b is transferred to the fire polishing part 34 of the first step, that of the third jig 150c is transferred to the fire polishing part 34 of the second step, that of the fourth jig 150d is transferred at the same time to the removal place, and the above-mentioned process is repeated.

The funnel 2 that is transferred to the removal place is delivered to the next process by the worker.

As mentioned above, in cracking off the moil 4 of the funnel 2, the present invention can guarantee increased productivity and avoids the danger to a worker in handling a hot funnel.

What is claimed is:

1. A moil crack-off system for a funnel which comprises:
   a pick-up apparatus, a conveyor, and a pair of parallel ware transfers arranged so that one said ware transfer is on each side of the conveyor, the pick-up apparatus being arranged intersectionally above the conveyor, said conveyor being extended for a shaping process of the funnel, said pick-up apparatus having a pair of carriers and vacuum pads located upon said carriers, said ware transfers having scoring parts and two-step fire polishing parts, such that when the funnel is carried riding on the conveyor, the funnel is adsorbed at a predetermined position by the vacuum pads of the carriers of the pick-up apparatus and is moved to both ware transfers in a three-dimensional manner, the ware transfers carrying the funnel to the scoring parts and then the two-step fire polishing parts such that the moil of the funnel is cracked off.

2. A moil crack-off system for a funnel as claimed in claim 1, wherein the conveyor has lifters being able to lift the funnel to a predetermined height.

3. A moil crack-off system for a funnel as claimed in claim 2, wherein above the lifters the conveyor has sensors for sensing the existence of the funnel.

4. A moil crack-off system for a funnel according to claim 3, wherein the pick-up apparatus includes a pair of parallel beams arranged intersectionally above the conveyor, first reciprocating means, which can reciprocate with a pair of carriers, the carriers comprising vertically extending rods, and elevating means, the elevating means connected to and acting vertically upon the rods, and the vacuum pads hanging beneath the rods in order to absorb the funnel when it is positioned on the conveyor.

5. A moil crack-off system for a funnel as claimed in claim 4, wherein the first reciprocating means and the elevating means are a double acting cylinder.

6. A moil crack-off system for a funnel as claimed in claim 1, wherein the ware transfers comprise beds and trailers that slide on the beds, a second reciprocating means attached to the trailers, and four jigs evenly spaced on the upper side of the trailers, the second reciprocating means used to reciprocate intermittently the trailers, the scoring parts and two-step fire polishing parts being arranged under the trailers so that the moil crack-off process of the funnel can be completed.

7. A moil crack-off system for a funnel as claimed in claim 6, wherein the trailers are shaped as a fork, and the scoring parts and two-step fire polishing parts are positioned in the middle of the fork shape of the trailers.

8. A moil crack-off system for a funnel as claimed in claim 6, wherein the second reciprocating means is a double acting cylinder.

9. A moil crack-off system for a funnel as claimed in claim 6, wherein the scoring parts have a burner, an adjustable screw and a nut which are used to adjust the height of the burner; a scoring lifter having a scoring frame located at the upper end of the scoring lifter, a hopper and a chute connected to each other and positioned under the burner.

10. A moil crack-off system for a funnel as claimed in claim 9, wherein the scoring lifter is a differential cylinder.

11. A moil crack-off system for a funnel as claimed in claim 6, wherein the two-step fire polishing part has a fire polishing lifter having a fire polishing frame suspended at the top end of the fire polishing lifter, a burner and a motor, said motor rotating the fire polishing frame, and the burner position being vertically adjustable by screw motion.

12. A moil crack-off system for a funnel as claimed in claim 11, wherein the fire polishing lifter is a differential cylinder.

13. A moil crack-off system for a funnel which comprises:
   a conveyor having sensors and lifters, said sensors being used to sense a funnel that is shaped by a mold and generating a start signal in response thereto, said lifters lifting the funnel according to the start signal from a position at the end of the conveyor to a predetermined height above the conveyor;
   a pick-up apparatus having:
      a pair of parallel beams arranged intersectionally above said conveyor,
      rails built on said beams,
      a pair of carriers spaced from each other at a predetermined interval able to glide on said rails,
      a single first reciprocating means connected to both of said carriers,
   rods vertically and centrally positioned upon said carriers, each rod having a plate at its upper end and a shield followed by a vacuum pad at its lower end, the lower end of each rod extending to a position below that of each respective carrier,
   elevating means for elevating each rod, said elevating means placed upon said carriers next to each rod and connected by the plate of the rod at the upper end of the rod, wherein, upon the start signal of said sensors, the elevating means cause the rods to descend, and each vacuum pad attaches to the funnel by vacuum, a pair of parallel were transfers arranged under the pick-up apparatus, the ware transfers each having a scoring part and a two-step fire polishing part, and beds for loading second reciprocating means, trailers supported by the beds slidably positioned on said beds, said trailers having on their upper side four jigs evenly spaced from each other, said second reciprocating means acting upon the jigs and causing the jigs to reciprocate intermittently,
   each scoring part having scoring lifters with upper ends, said scoring lifters being placed under the beds, a scoring apparatus located above the beds, a scoring frame located at the upper ends of the scoring lifters, said scoring frame including a burner of adjustable height and a hopper set up under the burner, said burner connected to a chute suspended on the scoring frame,
   each two-step fire polishing part having fire polishing lifters having upper ends and placed under the beds,
   fire polishing frames located at the upper ends of the fire polishing lifters, said fire polishing frames including a burner of adjustable height and rotation, said scoring frame and said fire polishing frame ascending or descending according to the reciprocating movement of the trailers;
   said first reciprocating means moving said pair if carriers such that the funnel is returned three-dimensionally from said conveyor to said ware transfers in a first jig position; said funnel being further gradually transferred from said first jig position to a second jig position which corresponds to the scoring part, from the second jig position to a third jig position which corresponds to the fire polishing part, from the third jig position to a fourth jig position which corresponds to a removal place of the funnel.

* * * * *